T. E. MURRAY.
GUARD DEVICE.
APPLICATION FILED MAR. 20, 1911.
1,028,253.
Patented June 4, 1912.
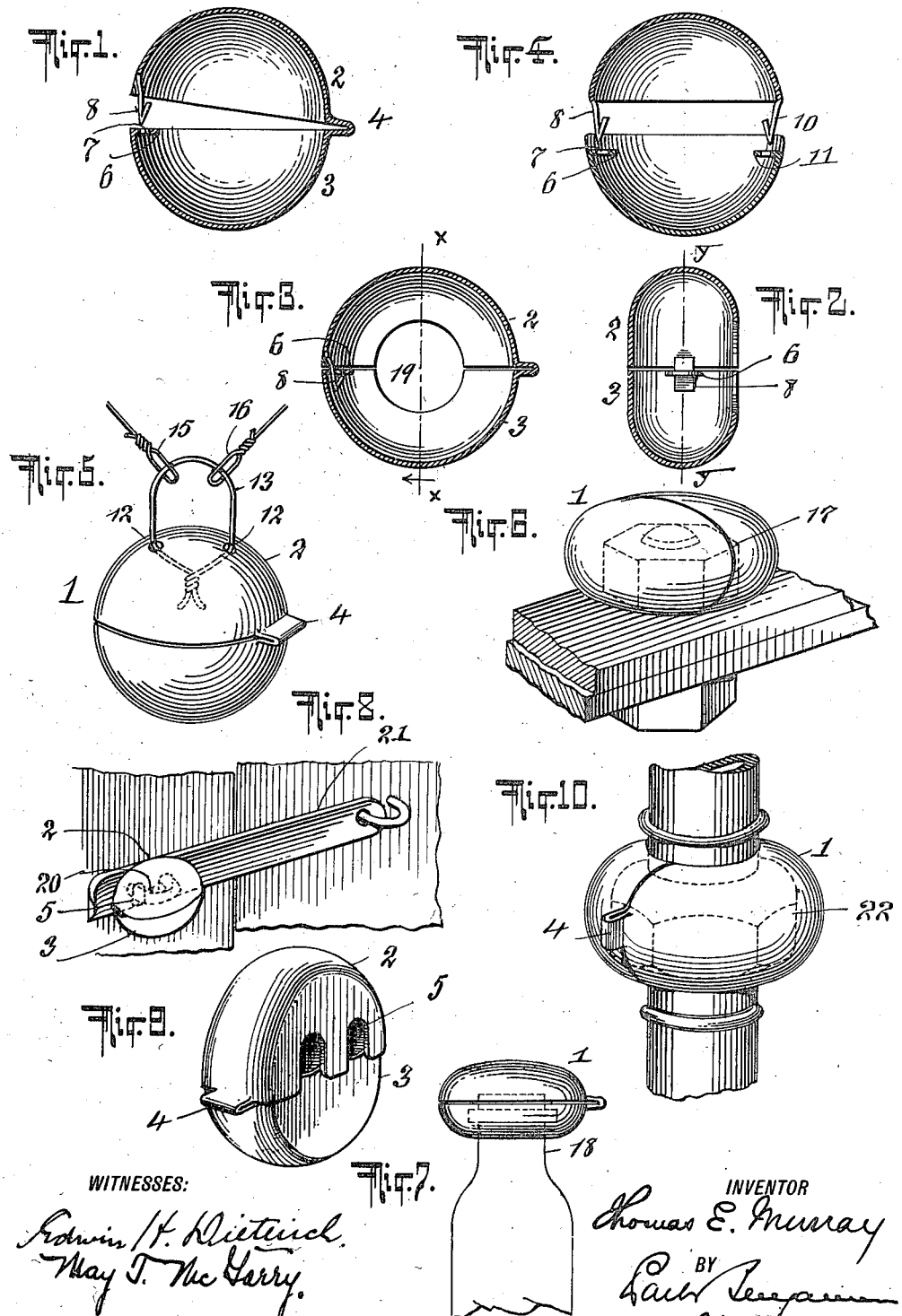
WITNESSES:
Edwin H. Dietrich
May T. McGarry
INVENTOR
Thomas E. Murray
BY
Paul [signature]
his ATTORNEY

UNITED STATES PATENT OFFICE.

THOMAS E. MURRAY, OF NEW YORK, N. Y.

GUARD DEVICE.

1,028,253.   Specification of Letters Patent.   Patented June 4, 1912.

Application filed March 20, 1911. Serial No. 615,597.

*To all whom it may concern:*

Be it known that I, THOMAS E. MURRAY, a citizen of the United States, residing at New York, in the county of New York and State of New York, have invented a certain new and useful Improvement in Guard Devices, of which the following is a specification.

The invention is a guard device, comprising a shell constructed in two parts so as to be applied to the object to be protected and to inclose the same, the said parts then being secured together by an unreleasable latch fastening. The device can not be removed from the object without mutilation of shell or fastening, and hence revelation of any undue access or tampering.

In the accompanying drawings—Figure 1 is a section of the shell in open position, on the line $y, y$ of Fig. 2. Fig. 2 is a section on the line $x, x$ of Fig. 3. Fig. 3 is a section of the shell in closed position, on the line $y, y$ of Fig. 2. Fig. 4 shows a modified form of the device in which the hinge is replaced by a second latch. Fig. 5 shows the device applied as a seal fastening. Fig. 6 shows it applied as a guard to prevent access to a nut, and Fig. 7 shows it similarly applied to a bottle neck to prevent access to the stopper. In Figs. 6 and 7, one wall of the shell has an opening to receive the shank of the nut or neck of the bottle, as also indicated in Fig. 2. Fig. 9 is a perspective view showing the shell with an opening in one wall, and notches in one or both of the edges of the opposite wall to receive a staple as shown in Fig. 8, which is a perspective view of staple and hasp with the guard device in place. Fig. 10 shows the device applied as a guard to a pipe union, both walls in this case having openings to receive the pipe.

Similar numbers of reference indicate like parts.

The shell 1, preferably in flattened spherical form, stamped or otherwise shaped from a single piece of thin metal, is made in two parts, 2, 3, flexibly connected, as by an integral hinge 4. The meeting edges of the parts of the shell may be provided with notches, as shown at 5, Fig. 9. Part 3 of the shell is flanged over at the meeting edge, as shown at 6, and said flanged over part has a slot or eye 7, to receive a spring hook or catch 8, formed at the corresponding portion of part 2. When the parts of the shell are brought together, the hook 8 passes through the eye 7, thus becoming compressed, and when the end of the hook clears the opening, it springs outwardly and gets a bearing on the under side of flange 6, thus locking part 3 of the shell upon part 2. Said parts then cannot be separated, without cutting off the hinge 4, breaking open the fastening or mutilating the shell, which, of course, at once reveals the fact that the device has been tampered with. Instead of connecting the parts 2, 3 by a hinge 4 and a hook 8, I may unite them by two similar hooks 8, 10, locking into eyes in flanges 6, 11, either hook then acting as a hinge, or both being detached when the parts are wholly separated.

My invention is susceptible of many useful applications, some of which are here illustrated.

In Fig. 5, it is shown applied as a seal fastening. For this purpose, two small openings 12 are made in part 2 of the shell, through which the shackle wire 13, passing through the eyes 15, 16 to be connected, is inserted: the ends of said wire being twisted together (as shown in dotted lines) inside the shell. After the wire has been inserted and twisted, the parts of the shell are brought together and locked, in the manner described. It is then impossible to get at the twisted parts of the wire or to separate the eyes 15, 16, without cutting the shackle wire 13 or mutilating the shell.

In Figs. 6 and 7, the device is shown applied to a nut 17 and to a bottle neck 18. Here, a semi-circular opening 19 is made in one wall of each part 2, 3, said openings meeting to form a circular opening, when the parts of the shell are locked together, which circular opening then incloses the shank on the nut, or the neck of the bottle. Access cannot then be had to the nut or to the bottle stopper until the shell is removed, which, as before, cannot be done, without mutilating it.

In Fig. 8, the shell shown in Fig. 9 is placed and locked upon the staple 20, after the hasp 21 has been adjusted thereon, the notches 5 in the meeting edges of the parts 2, 3 then receiving the legs of the staple. The hasp cannot be taken from the staple, without mutilating the shell. Semi-circular openings, similar to 19, may be made in both walls of the shell, so that said shell may be applied to a pipe and locked. Thus, in Fig. 10, the shell, thus constructed, incloses a pipe union 22, so that it is impossible to reach the same without mutilation of the shell, as before.

It is to be understood that in all the modifications of my device shown in the drawing, the unreleasable latch fastening within the shell comprising a spring hook on one of the parts and an eye on the other part receiving and engaging said hook, is present.

I claim:

A guard device comprising a shell divided into two flexibly connected parts and having a suitable opening or openings in its wall whereby it may be applied to the object to be guarded so as to inclose the same, and an unreleasable latch fastening within said shell comprising a spring hook on one of said parts and an eye on the other part receiving and engaging said hook.

In testimony whereof I have affixed my signature in presence of two witnesses.

THOMAS E. MURRAY.

Witnesses:
GERTRUDE T. PORTER,
MAY T. McGARRY.